United States Patent Office 2,713,077
Patented July 12, 1955

2,713,077

REMOVAL OF CARBONYL SULFIDE FROM HYDROCARBON GASES

Robert W. Rieve, Philadelphia, Pa., assignor to The Atlantic Refining Company, Philadelphia, Pa., a corporation of Pennsylvania No Drawing. Application May 25, 1954,
Serial No. 432,330

3 Claims. (Cl. 260—676)

This invention relates to the removal of carbonyl sulfide from hydrocarbon fluids and more particularly to the removal of carbonyl sulfide from fluid mixtures obtained by the reaction of steam with hydrocarbons or coke, or both, and the mixtures obtained from the thermal or catalytic cracking of petroleum oils.

In the refining of crude petroleum oils many types of sulfur compounds must be removed whether lubricating oils, furnace oils, gasoline or lighter hydrocarbons are being produced. For example, hydrogen sulfide and mercaptans contained in these fractions are particularly objectionable and methods for their removal are usually based upon their acidic properties and the insolubility of certain heavy metal sulfides.

Another form of sulfur found in the normally gaseous fractions produced in the refining of crude petroleum oils is carbonyl sulfide. This compound is found particularly in the normally gaseous fractions such as the two, three, and four carbon atom fractions since its boiling point is near that of propane. Fractionation, therefore, is not a suitable method for removing carbonyl sulfide from the gaseous hydrocarbons. The usual treatment for removal of acidic sulfur compounds such as washing with strong caustic solutions removes little or no carbonyl sulfide, since this compound is quite stable and hydrolyzes to carbon dioxide and hydrogen sulfide only very slowly even in the presence of strong caustic solutions.

Accordingly, it has been proposed heretofore to remove carbonyl sulfide by methods involving oxidation in the presence of various catalysts, conversion to insoluble metallic sulfides in the presence of a heavy metal and an alkaline reagent, and absorption with alkanolamines. None of these prior art methods has proved to be satisfactory on a commercial scale, and in addition each of the prior art methods is objectionable either from the standpoint of safety or the use of corrosive reagents.

It is an object of the present invention, therefore, to provide a novel and economical process for the removal of carbonyl sulfide from hydrocarbon mixtures in which it occurs.

It is a further object of the invention to provide a commercial process for the removal of carbonyl sulfide from normally gaseous hydrocarbons produced in the refining of crude petroleum oil.

As has been pointed out hereinbefore, carbonyl sulfide is relatively stable in the presence of strong alkaline reagents, and will hydrolyze only slowly in the presence of such reagents even when subjected to highly elevated temperatures. It has now been found, however, that carbonyl sulfide can be removed from a hydrocarbon stream at ordinary atmospheric temperatures and without the use of corrosive, strong caustic solutions by a method involving hydrolysis on an ion exchange resin. This novel discovery that carbonyl sulfide can be rapidly hydrolyzed at ordinary temperatures with an ion exchange resin in the absence of any strong caustic reagent, is the essence of this invention.

In accordance with the invention, gaseous hydrocarbon mixtures containing carbonyl sulfide are passed over a bed of anion exchange resin which has been converted to the hydroxyl cycle. The hydrocarbon effluent from the bed of anion exchange resin is almost completely free not only of carbonyl sulfide but also of its hydrolysis products, hydrogen sulfide and carbon dioxide. When the capacity of the bed for conversion and adsorption has been reached the hydrocarbon stream is diverted to a freshly regenerated bed of anion exchange resin while the first bed is regenerated in the conventional manner with a solution of sodium hydroxide. Following regeneration, the first bed is then ready for another carbonyl sulfide removal cycle.

Various commercially available anion exchange resins are suitable for use in the instant invention. For example, a particularly suitable group of resins are the reaction products of tertiary amines with haloalkylated vinyl aromatic hydrocarbon copolymers described in U. S. Patent No. 2,591,573, manufactured and sold by the Rohm and Hass Company, Philadelphia, Pennsylvania, under the designation Amberlite IRA–400. Similar resins available from other manufacturers are equally suitable for this invention.

The resin is converted to the hydroxyl cycle prior to use, for example, by treatment with an aqueous solution of sodium hydroxide, 5 to 10 per cent concentration being suitable following which the resin is washed with distilled or de-ionized water and left in the wet, fully hydrated, condition for use.

The following examples are provided for the purpose of illustrating the invention in its broader aspects, the details of such examples, however, should not be considered as limiting the invention thereto.

EXAMPLE

A gaseous mixture comprising about 90 per cent by weight of propane and 10 per cent by weight of carbonyl sulfide was passed over a 210 cc. (71.8 gram) bed of Amberlite IRA–400 anion exchange resin at room temperature. The resin prior to contact with the gaseous mixture had been converted to the hydroxyl cycle by treatment with a 6 per cent aqueous solution of sodium hydroxide and washed with distilled water. The resin was contacted while wet with water, that is, fully hydrated.

The effluent gas was analyzed for carbonyl sulfide, carbon dioxide and hydrogen sulfide. The gas introduction rate was varied at successive time intervals during the run. The exact experimental conditions and results are set forth in Table I:

*Table I*

| Time Period Number | Time Interval, Mins. | Gas Rate, Liters/ Minute | Liters of Gas, In | Mols. of COS, In | Mols. of COS, Out | Mols. $CO_2$, Out | Mols. $H_2S$, Out |
|---|---|---|---|---|---|---|---|
| 1 | 10 | 1.05 | 10.5 | 0.030 | 0.003 | 0.0 | 0.0 |
| 2 | 10 | 0.40 | 4.0 | 0.012 | 0.003 | 0.0 | 0.0 |
| 3 | 10 | 0.21 | 2.1 | 0.006 | 0.002 | 0.002 | 0.0 |
| 4 | 40 | 0.09 | 3.6 | 0.011 | 0.004 | 0.005 | 0.005 |

It should be noted that a gas containing 10 per cent carbonyl sulfide would never be encountered in ordinary refinery hydrocarbon streams, since ordinarily such streams contain less than one per cent and usually only a few parts per million of carbonyl sulfide. Since it would require prohibitively long experimental runs using a hydrocarbon stream containing only a few parts per million of carbonyl sulfide, a highly concentrated mixture of carbonyl sulfide in propane was used to demonstrate the principles of the invention in runs requiring reasonably short periods of time.

It has been found that from 1 to 10 liters of gas per minute per 1000 cc. of resin is a preferable gas introduction rate, although there are many factors which will influence the rate for optimum efficiency such as pressure drop across the bed, shape of the bed, concentration of carbonyl sulfide and similar factors.

The data show that very high efficiencies of removal are obtained at the outset of the on-stream time, but that as the adsorption continues the efficiency declines until regeneration is required. The data demonstrate conclusively that the carbonyl sulfide is hydrolyzed by the anion exchange resin and that the hydrolysis products are adsorbed on the resin until the capacity of the bed is reached, although the data indicate that hydrolysis continues even after hydrolysis products appear in the effluent.

I claim:

1. A process for the removal of carbonyl sulfide from hydrocarbon fluids containing carbonyl sulfide which comprises contacting at ordinary atmospheric temperatures said fluid with an anionic exchange resin, said resin being in the hydroxyl cycle and hydrated.

2. A process for the removal of carbonyl sulfide from normally gaseous hydrocarbon mixtures containing carbonyl sulfide which comprises contacting at ordinary atmospheric temperatures said mixture with an anionic exchange resin, said resin being in the hydroxyl cycle and hydrated.

3. A process for the hydrolysis of carbonyl sulfide which comprises contacting at ordinary atmospheric temperatures the carbonyl sulfide with an anionic exchange resin, said resin being in the hydroxyl cycle and hydrated.

References Cited in the file of this patent

UNITED STATES PATENTS

| | | |
|---|---|---|
| 2,149,039 | Benning et al. | Feb. 28, 1939 |
| 2,309,871 | Schulze et al. | Feb. 2, 1943 |
| 2,311,342 | Kerns et al. | Feb. 16, 1943 |
| 2,566,353 | Mills | Sept. 4, 1951 |
| 2,592,523 | Ayers et al. | Apr. 15, 1952 |